(12) United States Patent
Kopp et al.

(10) Patent No.: US 7,344,362 B2
(45) Date of Patent: Mar. 18, 2008

(54) TURBOCHARGER

(75) Inventors: Adrian Kopp, Kirchdorf (CH); Marco Gartmann, Lengnau (CH); Tobias Gwehenberger, Zürich (CH)

(73) Assignee: ABB Turbo Systems AG, Baden (CH)

( * ) Notice: Subject to any disclaimer, the term of this patent is extended or adjusted under 35 U.S.C. 154(b) by 25 days.

(21) Appl. No.: 10/510,581

(22) PCT Filed: Apr. 10, 2003

(86) PCT No.: PCT/CH03/00237

§ 371 (c)(1),
(2), (4) Date: Mar. 22, 2005

(87) PCT Pub. No.: WO03/087541

PCT Pub. Date: Oct. 23, 2003

(65) Prior Publication Data

US 2005/0175477 A1    Aug. 11, 2005

(30) Foreign Application Priority Data

Apr. 12, 2002   (EP) .................... 02405293

(51) Int. Cl.
*F04B 17/00*   (2006.01)
(52) U.S. Cl. .................... 417/407
(58) Field of Classification Search .......... 417/407
See application file for complete search history.

(56) References Cited

U.S. PATENT DOCUMENTS

| 3,652,176 A | | 3/1972 | Walsh | |
|---|---|---|---|---|
| 3,961,867 A | * | 6/1976 | Woollenweber | 417/407 |
| 4,969,805 A | * | 11/1990 | Romeo | 417/407 |
| 5,207,566 A | * | 5/1993 | Munkel et al. | 417/407 |
| 6,499,969 B1 | * | 12/2002 | Tombers et al. | 417/407 |

FOREIGN PATENT DOCUMENTS

| DE | 36 28 687 | 2/1988 |
|---|---|---|
| DE | 38 01 590 | 8/1988 |

* cited by examiner

*Primary Examiner*—Michael Koczo, Jr.
(74) *Attorney, Agent, or Firm*—Buchanan Ingersoll & Rooney PC

(57) ABSTRACT

In a turbocharger (1), comprising a turbine (2) and a compressor (3) connected to the turbine (2), the turbine (2) contains a turbine wheel (4) and the compressor (3) contains a compressor wheel (7) which are connected to one another by means of a shaft (10) and are arranged in a housing (5, 9, 16). During operation, if the compressor wheel (7) separates from the shaft (10), an axial force acts on the turbine wheel (4) and the shaft (10) connected thereto.

A means (22, 25) for axially locking the shaft and the turbine wheel connected thereto in the housing (5, 9, 16) is arranged on the shaft (10) connected to the turbine wheel (4).

9 Claims, 3 Drawing Sheets

TURBOCHARGER

TECHNICAL FIELD

The invention is based on a turbocharger according to the preamble of the first claim.

PRIOR ART

By means of turbochargers, the exhaust gases of an internal combustion engine can be used for compressing the combustion air fed to the internal combustion engine. To this end, the turbocharger has a turbine and a compressor which sit on a common shaft. The exhaust gases of the internal combustion engine are expanded in the turbine and converted into rotational energy. The rotational energy obtained is transmitted by means of the shaft to the compressor, which compresses the air fed to the internal combustion engine. By using the energy of the exhaust gases for compressing the air fed to the combustion process of the internal combustion engine, the combustion process and the energy efficiency of the internal combustion engine can be optimized.

Since the center part of the housing in turbochargers, on account of the bearing contained therein, is normally prefabricated and closed or is possibly even in one piece, the compressor wheel is not connected to the shaft and the turbine wheel fastened thereto until during the assembly of the turbocharger, so that the subassembly of turbine/shaft/compressor can actually be fitted into the housing. A disadvantage with this construction is that, in the event of the compressor wheel bursting, the shaft is no longer fixed axially in the housing and by the bearings, and the shaft may escape axially from the housing on account of the axial forces produced by the turbine wheel. In order to prevent this as far as possible, the housing or an exhaust manifold or plate-type diffuser or exhaust attached to the housing is normally strengthened in such a way that parts breaking off or the shaft are safely held in the housing. However, this strengthening is relatively expensive and complicated, and, if high axial forces produced by the turbine wheel act on the shaft, the latter can nonetheless escape from the housing and lead to serious accidents.

DESCRIPTION OF THE INVENTION

The object of the invention, in the case of a turbocharger of the type mentioned at the beginning, is to propose a simple and cost-effective device for preventing the escape of the shaft from the housing.

According to the invention, this is achieved by the features of the first claim.

The essence of the invention is therefore that a means for axially locking the shaft and the turbine connected thereto in the housing is arranged on the shaft connected to the turbine wheel.

The advantages of the invention can be seen, inter alia, in the fact that, in the event of the compressor wheel bursting, the remaining shaft and the turbine wheel fastened thereto can be safely held in the housing with the aid of simple means. Despite the means used for the axial locking, the turbocharger can still be assembled and operated in the same known conventional manner without making assembly or dismantling more difficult. Effects on the rotor, i.e. unbalance, are prevented through the use of essentially radially symmetrical means for the axial locking.

It is especially expedient if a locking ring, such as a snap ring for example, is used as the means for the axial locking. These means are inexpensive and simple in application, since, apart from the locking ring, which is simple to obtain, no further additional components are required. In addition, the changes in the components used hitherto are minimal. The annular groove which has to be provided on the shaft for accommodating the locking ring is very small and has no effect on the characteristics of the shaft.

Further advantageous configurations of the invention follow from the subclaims.

BRIEF DESCRIPTION OF THE DRAWINGS

Exemplary embodiments of the invention are explained in more detail below with reference to the drawings. The same elements are provided with the same designations in the various figures. The direction of flow of the media is indicated by arrows.

In the drawing.

Only the elements which are essential for the direct understanding of the invention are shown. Of the system, for example, the associated internal combustion engine is not shown.

Ways of Implementing the Invention

Figure 1:
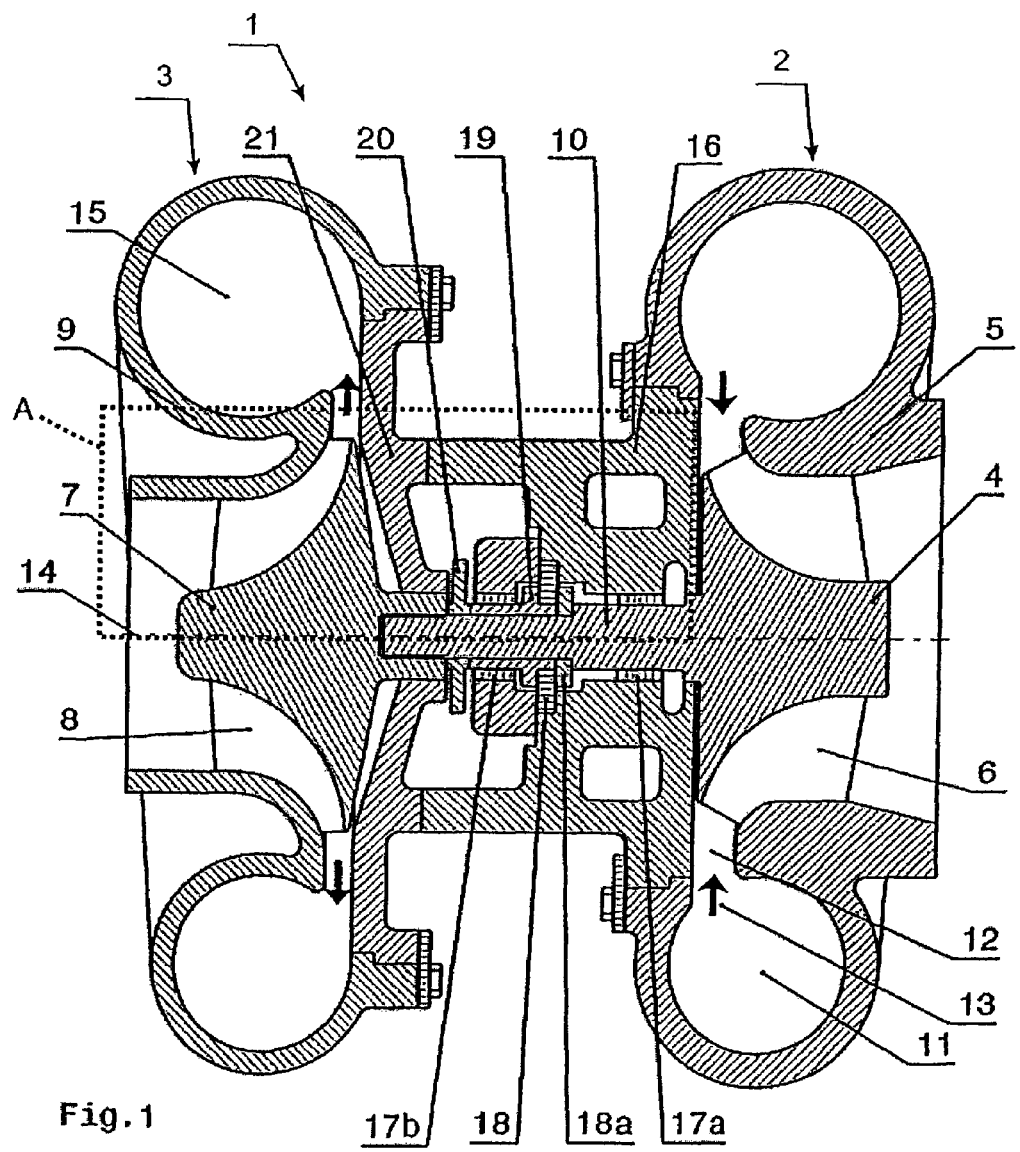
FIG. 1 shows a schematic longitudinal section through a turbocharger according to the prior art.

A turbocharger 1 comprising a turbine 2 and a compressor 3 is shown schematically in longitudinal section in FIG. 1. The turbine 2 essentially comprises a turbine wheel 4 with turbine blades 6 and a turbine housing 5, which encloses the turbine wheel 4. The compressor 3 comprises a compressor wheel 7 with compressor blades 8 and a compressor housing 9 enclosing the compressor wheel 7. The turbine wheel 4 and the compressor wheel 7 are connected to one another via a shaft 10, which is mounted in the bearing housing by means of various bearing elements. In the example shown here, the turbine 2 and the compressor 3 are designed as a radial-flow turbine and a radial-flow compressor. The turbine wheel 4 is driven in a known manner by the exhaust gases of an internal combustion engine (not shown), which are fed to the turbine wheel 4 via passages 11, 12. The expanded exhaust gas, cooled by the expansion, is discharged via an exhaust-gas passage (not shown in any more detail). The compressor wheel 7 connected to the turbine wheel 4 by means of the shaft 10 is likewise set in rotation by the rotary movement of the turbine wheel 4. Air 14 is drawn in by the compressor wheel 7, is compressed and is fed in a known manner to the internal combustion engine (not shown) via a discharge passage 15 for increasing the efficiency.

In order to assemble the turbocharger 1, the turbine wheel 4 connected to the shaft 10 is pushed in the direction of the compressor side into a bearing housing 16. In this case, the turbine-side radial bearing 17a, as shown here, may already be fitted in the bearing housing 16 or pushed onto the shaft 10. After that, for the further mounting of the shaft 10, a thrust bearing 18, a thrust ring 18a and an auxiliary bearing 19 are pushed onto the shaft 10. Finally, the bearing cap 21 with prefitted sealing disk 20 and a compressor-side radial bearing 17b are put onto the shaft. All the elements 18, 18a, 19, 20 which have been pushed on are then axially fixed between the bearing housing 16 and the compressor wheel 7 by screwing the compressor wheel 7 onto the shaft 10. On the turbine side, the turbine housing 5 can now be pushed over the turbine wheel 4 and be fastened to the bearing housing 16. On the compressor side, the compressor housing 9 can accordingly be pushed over the compressor wheel 7 and likewise fastened to the bearing housing 16. In turbochargers which are different from the one shown in this example, the assembly sequences may turn out to be slightly different in detail, although the basic principle of pushing the shaft with the turbine wheel into the bearing housing, the subsequent pushing into place of the various bearing elements and the fixing of the compressor wheel on the shaft remain the same.

By the fastening of the compressor wheel 7 to the shaft 10—in this example the shaft end has an external thread and the compressor wheel 7 has an internal thread for fixing the compressor wheel—the subassembly of compressor wheel/ shaft/turbine wheel is reliably held in the bearing housing 16 with slight axial play by the interplay between sealing disk 20, auxiliary bearing 19, thrust bearing 18, thrust ring 18a, the radial bearings 17a and 17b and the bearing housing 16. However, if the compressor wheel 7 bursts during operation of the turbocharger 1 or if the connection between compressor wheel 7 and shaft 10 shears off, the turbine wheel 4 accelerates to inadmissibly high speeds, since the counterforce otherwise produced by the compressor wheel 7 is absent. In addition, the turbine wheel 4 is subjected to an axial force component, which, owing to the lack of compensation by the compressor wheel 7, this compensation otherwise being available, leads to an axial movement of shaft 10 and turbine wheel 4. Depending on the prevailing forces, with the destruction of the turbine wheel 4, the turbine wheel 4 and shaft 10 escape axially from the turbine housing 5. This may lead to the environment and the operating personnel being put at risk.

Figure 2:
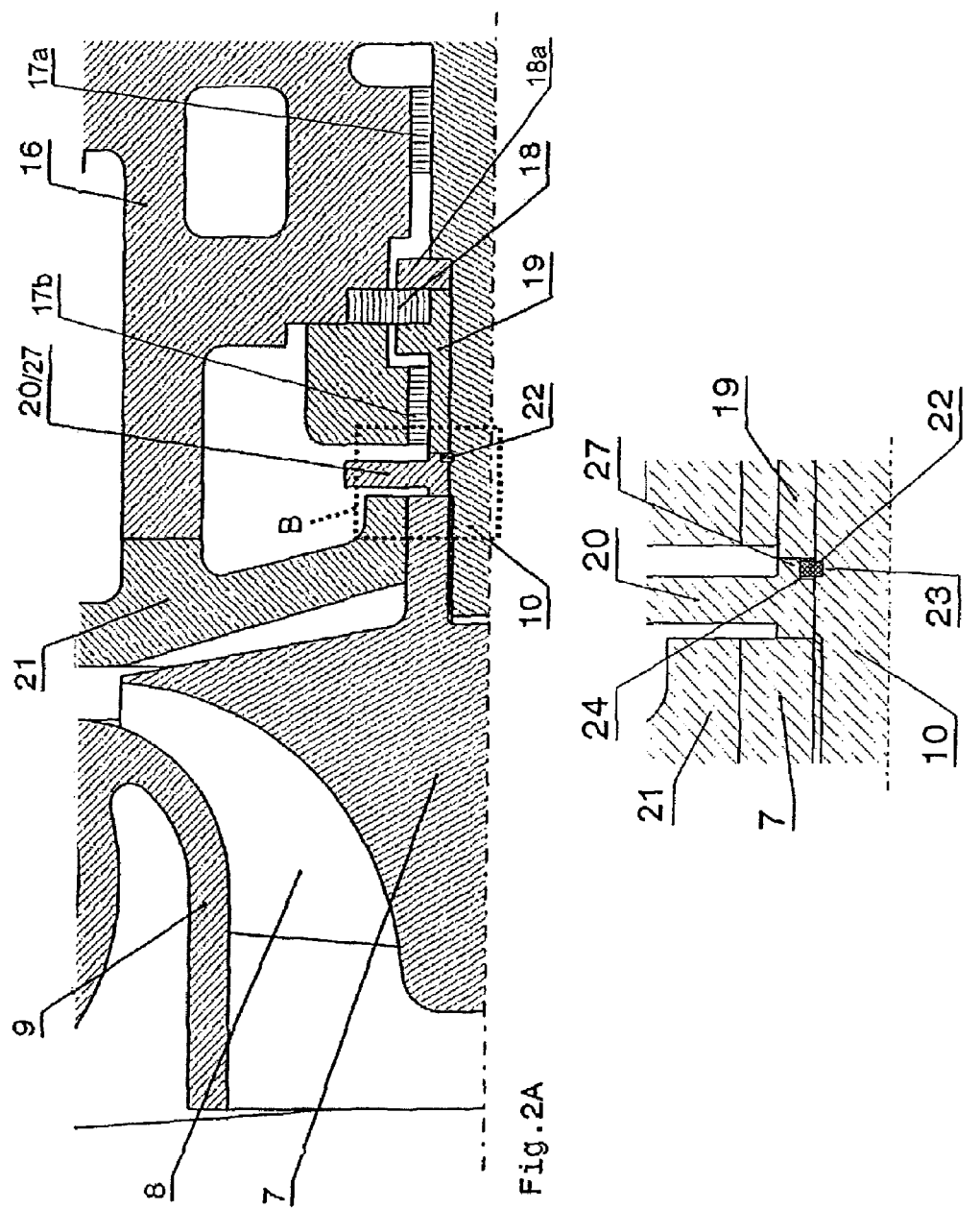
FIG. 2A shows detail A from FIG. 1 in an enlargement, but with a first embodiment of the subject matter of the invention.
FIG. 2B shows detail B from FIG. 2A in a further enlargement of the first embodiment of the subject matter of the invention.

FIG. 2A shows a compressor-side detail of a turbocharger 1 according to the invention, which in principle is of the same design as the turbocharger 12 according to the prior art shown in FIG. 1. However, as can be seen in FIGS. 2A and 2B, according to the invention a locking ring 22, which in this example is designed as a snap ring, is arranged on the shaft 10. The locking ring 22 engages in an annular groove 23 of the shaft 10 and projects radially outward beyond said annular groove 23, the axial flanks of which fix the locking ring 22 axially in its position in a precisely fitting manner or with slight clearance for the assembly. Also conceivable is an annular groove (not shown) whose axial width is greater than the axial width of the locking ring 22, in which annular groove the locking ring 22 is positioned close to the compressor-side flank when stationary and during normal operation, since the compressor-side flank in particular is relevant to the force flow of the axial forces occurring in the event of bursting. The locking ring 22 is surrounded radially by a locking element 27, which for the assembly surrounds the locking ring 22 with slight radial clearance. So that the locking ring 22 cannot move radially out of the annular groove 23 during operation, this radial clearance is less than the radial depth of the annular groove 23, so that the locking element 27 encloses the locking ring 22 radially in a precisely fitting manner during operation. In the example shown here, the sealing disk 20 fulfills the task of the locking element 27, so that, apart from the locking ring 22, no additional element is required, which simplifies the assembly. In order to fulfill the task of the locking element 27, the sealing disk 20 has a recess 24 on the turbine side, the radial extent of this recess 24 corresponding, with clearance, approximately to that part of the locking ring 22 which projects radially beyond the annular groove 23. The axial width of the recess 24 is slightly larger than the axial width of the locking ring 22, so that the locking ring 22 is arranged in the annular groove 23 of the shaft 10 with axial clearance relative to the sealing disk 20 and the adjacent auxiliary bearing 19. This axial clearance ensures that the locking ring 22 is not loaded in the axial direction under normal conditions when stationary and during operation.

During the assembly of a turbocharger 1 with the means 22 according to the invention, and just described, for axially locking the shaft 10, the procedure is as described above for the prior art. However, the locking ring 22 is not inserted into the annular groove 23 until after the fitting of the auxiliary bearing 19. The locking ring 22, no matter whether configured as a snap ring or in the form of ring segments which can be joined together, is designed in such a way that it is closed after placing in the annular groove 23 and sits on the shaft radially free of play when stationary, so that the locking ring 22 is essentially radially symmetrical in the fitted state. This is necessary in order to avoid unbalance of the shaft 10. After that, the sealing disk 20 is pushed over the shaft 10 and, with its recess 24, over the locking ring 22 to such an extent that it comes to bear against the auxiliary bearing 19 on the turbine side. The locking ring 22 is thus surrounded axially with clearance by the sealing disk and auxiliary bearing 19, while during operation it is secured radially on the outside by the sealing disk 20 in a precisely fitting manner. After that, the compressor wheel 7 is connected to the shaft 10, e.g. by means of a screwed connection. The fitted compressor wheel 7 presses the sealing disk 20, auxiliary bearing 19, thrust bearing 18 and thrust ring 18a together with the shaft 10—to be more precise with a shoulder, serving as abutment, of the shaft 10—and fixes said elements in this way. The axial clearance of the locking ring 22 between sealing disk 20 and auxiliary bearing 19 results in the locking ring 22 not being loaded axially during normal operation. If the compressor wheel 7 bursts, the shaft 10, driven by the axial forces of the turbine wheel 4, can move axially in the direction of the turbine side only until the locking ring 22 comes to bear against the auxiliary bearing 19 and a positive-locking connection between shaft 10 and auxiliary bearing 19 is produced by means of the locking ring 22. The axial forces are then introduced into the bearing housing 16 via the auxiliary bearing 19 and by the thrust bearing 18. Due to the sealing disk 20, which radially encloses the locking ring 22 and which is held axially by the housing, the locking ring 22 continues to remain fixed radially on the shaft.

After the separation of the compressor wheel 7, an axial movement of the shaft 10 in the direction of the turbine wheel 4 is thus prevented by the locking ring 22. Since the counterforce produced by the compressor wheel 7 is absent, the turbine wheel 4 revs up to very high speeds until the blades 6 or the entire hub bursts and brakes the turbine wheel 4 as a result or until the shaft 10 is braked by means which are not shown in any more detail.

Figure 3:
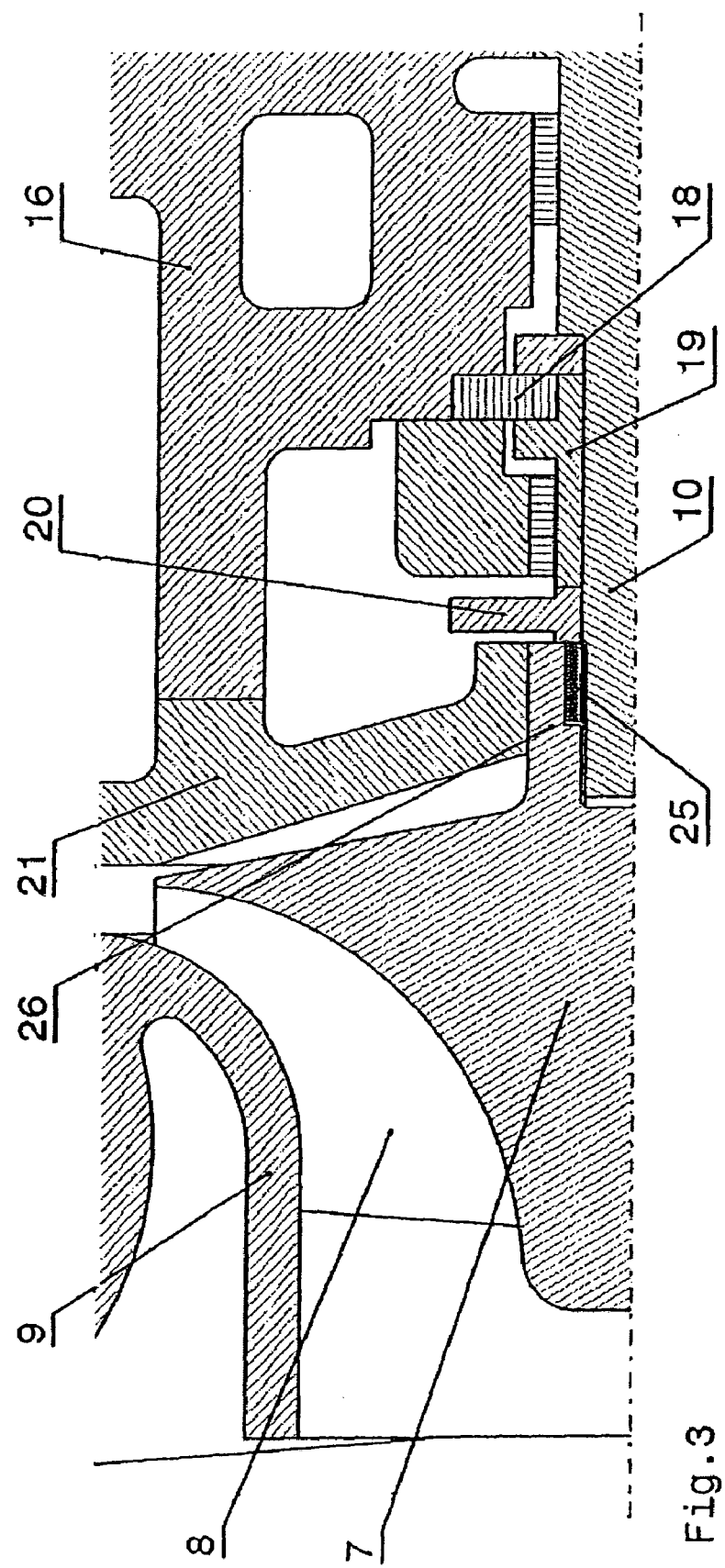
FIG. 3 shows a second embodiment of the subject matter of the invention in an illustration analogous to the illustration in FIG. 2A.

A further solution for axially locking the shaft 10 in the event of damage is shown in FIG. 3. After the sealing disk 20 has been fitted, an essentially radially symmetrical retaining sleeve 25 is put onto the shaft 10 and is firmly connected, e.g. screwed, to the latter, this retaining sleeve 25 retaining the sealing disk 20 and the auxiliary bearing 19 on the shaft.

After that, the compressor wheel 7 is put onto the shaft, the compressor wheel 7 having a recess 26 and enclosing the retaining sleeve 25.

If the compressor wheel 7 bursts, and the shaft 10 wants to move axially in the direction of the turbine wheel 4, a positive-locking connection between shaft 10, sealing disk 20 and auxiliary bearing 19 is obtained via the retaining sleeve 25. The auxiliary bearing 19 is in turn secured in the axial direction by the thrust bearing 18, which is held in the bearing housing 16.

After the separation of the compressor wheel 7, an axial movement of the shaft 10 in the direction of the turbine wheel 4 is prevented by means of the retaining sleeve 25 in a similar way to the locking ring 22 in the previous solution. Since the counterforce produced by the compressor wheel 7 is absent, the turbine wheel 4 revs up to very high speeds until the blades 6 or the entire hub bursts and brakes the turbine wheel 4 as a result or until the shaft 10 is braked by means which are not shown in any more detail.

The invention is of course not restricted to the exemplary embodiments described and shown in the figures. Other exemplary embodiments of means for axial locking according to the invention may be provided. The locking means according to the invention may also be used in turbine and compressor types different from that shown here. Instead of said bearing elements, other bearing elements, in bearings of different construction, may interact in the same manner with the locking means according to the invention arranged on the shaft. The examples described and shown in the figures indicate the principle of the mode of operation of the locking means only with reference to practical embodiments and therefore do not constitute a restriction.

DESIGNATIONS

1 Turbocharger
2 Turbine
3 Compressor
4 Turbine wheel
5 Turbine housing
6 Turbine blade
7 Compressor wheel
8 Compressor blade
9 Compressor housing
10 Shaft
11 Feed passage
12 Passage
13 Exhaust gas
14 Air
15 Discharge passage
16 Bearing housing
17a Turbine-side radial bearing
17b Compressor-side radial bearing
18 Thrust bearing
18a Thrust ring
19 Auxiliary bearing
20 Sealing disk
21 Bearing cap
22 Locking ring
23 Annular groove
24 Recess, sealing disk
25 Retaining sleeve
26 Recess, compressor wheel
27 Locking element

The invention claimed is:

1. A turbocharger, comprising a turbine with a turbine wheel and a compressor with a compressor wheel, the turbine wheel and the compressor wheel being connected via a shaft, the shaft being rotatably and axially mounted by means of a radial bearing and a thrust bearing arranged between the turbine wheel and the compressor wheel, and the turbine wheel, the shaft and the compressor wheel being arranged in a housing and connected to one another in such a way that, in the event of the compressor wheel bursting, an axial force acts on the turbine wheel and the shaft connected to the turbine wheel, the force acting in the direction of the turbine, wherein a means for axially locking the shaft and the turbine wheel connected to the shaft is arranged on the shaft between the compressor wheel and the thrust bearing, the means, for axially locking the shaft in the event of the compressor wheel bursting, preventing an axial movement of the shaft and of the turbine wheel connected to the shaft in the direction of the turbine.

2. The turbocharger as claimed in claim 1, wherein, in the event of the compressor wheel bursting, the means for axially locking the shaft produces a locking connection between the shaft and an auxiliary bearing firmly connected to the shaft, and the auxiliary bearing is secured in the axial direction by the thrust bearing of the shaft.

3. The turbocharger as claimed in claim 1, wherein the means for axially locking the shaft is essentially radially symmetrical.

4. The turbocharger as claimed in claim 1, wherein the means for axially locking the shaft is a locking ring arranged on the shaft.

5. The turbocharger as claimed in claim 4, wherein an encircling annular groove for accommodating the locking ring is arranged in the shaft, the inserted locking ring projecting radially outward beyond the annular groove.

6. The turbocharger as claimed in claim 5, wherein axial flanks of the annular groove enclose the locking ring axially in a precisely fitting manner.

7. The turbocharger as claimed in claim 5, wherein axial flanks of the annular groove enclose the locking ring axially with clearance.

8. The turbocharger as claimed in claim 1, wherein the means for axially locking the shaft is a retaining sleeve fastened to the shaft.

9. A means for axially locking a shaft and the components of a turbocharger which are firmly connected to this shaft, a turbine wheel and a compressor wheel being arranged in a rotationally fixed manner on the shaft, the shaft being rotatably and axially mounted by means of a radial bearing and a thrust bearing arranged between the turbine wheel and the compressor wheel, and the turbine wheel, the shaft and the compressor wheel being arranged and connected to one another in such a way that, in the event of the compressor wheel bursting, an axially acting force acts on the shaft and on the components firmly connected to the shaft, wherein the means for axially locking the shaft is connected to the shaft between the compressor wheel and thrust bearing in such a way that the means for axially locking the shaft interacts with the thrust bearing by contact between the means for axially locking the shaft and an auxiliary bearing and contact between the auxiliary bearing and the thrust bearing in the event of the compressor wheel bursting, so that the axially acting force is compensated for by this interaction and an axial movement of the shaft and of the components firmly connected to the shaft is prevented.

* * * * *